July 9, 1929.  J. P. MÜLLER  1,719,901
BALANCE BEAM
Filed May 19, 1928
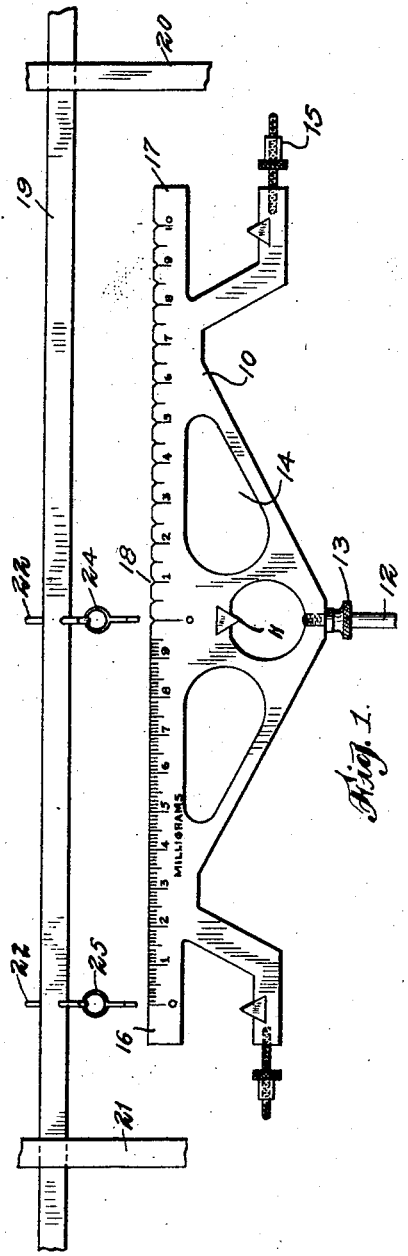
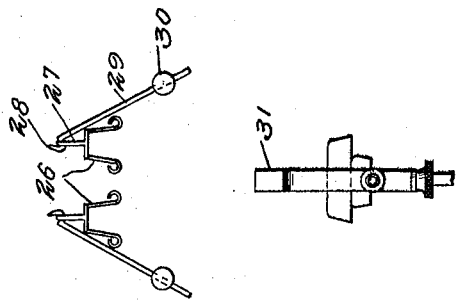
Inventor
John P. Müller
By his Attorney
George C. Heinire

Patented July 9, 1929.

1,719,901

UNITED STATES PATENT OFFICE.

JOHN P. MÜLLER, OF NEW ROCHELLE, NEW YORK.

BALANCE BEAM.

Application filed May 19, 1928. Serial No. 278,993.

My invention relates to improvements in the beams of scales or balances, particularly of that class of beams in which the bearings are equidistant from the fulcrum of the beam and which are usually designed for the greatest possible lightness for a given carrying capacity, such as are used in combination with instruments of great precision and sensitiveness, as for instance analytical and assay balances, and it is the principal object of my invention to provide such a beam with a system of graduations comprising a series of graduations capable of dividing certain units of weight, such as the gram into the subdivisions usual in instruments of the class described, the purposes being to eliminate the use of a multiple of fractional weights ordinarily placed upon the pans of the instrument to effect a poise in weighing and without the necessity of employing auxiliary scales, as such scales increase the weight of the beam and thereby decrease or hamper the sensitiveness of the instrument.

To accomplish the aforesaid objects, I provide a beam with bearings equidistant from the fulcrum of the beam, the arms of which to both sides of the fulcrum are equipped with different graduations, as for instance, milligram graduations on the left arm and centigram graduations on the right arm, or a combination of centigram and decigram graduations on the right arm, according to whether a single poise or rider suspension or a modification of same is used.

Another object of my invention is to provide a scale beam or balance beam in which the graduations on one of its arms range from 0 to 0, for instance from the left to the center, and are of relatively small denominations, while the graduations on its other arm ranging from 0 to 10, for instance from the center to the right, are of relatively larger denominations and are provided with notches, at equally divided points to coincide with the graduations, the central 0 point serving as a termination of one scale and the beginning of the other.

A further object of my invention is the provision of a balance or scale beam in combination with which poises or riders are used which are so small, delicate or fragile that mechanical means must be employed for shifting these poises or riders.

It is a still further object of my invention to provide such mechanical poise shifting means of an extremely simple construction in order to avoid interference with their manipulation which may otherwise be caused by the corrosive influence of acids or chemical fumes to which instruments of this class are frequently exposed.

My invention furthermore includes therefore the provision of one or more rotatably and slidably mounted rods equipped with hooks so arranged as to engage with either of the riders or poises in any position of the scales.

These and other objects and advantages of my invention will become more fully known as the description thereof proceeds, and will then be specifically defined in the appended claims.

In the accompanying drawing, forming a material part of this disclosure:

Fig. 1 is a front elevation of a scale beam constructed according to my invention, with a rotatably and slidably mounted rod equipped with a hook engaged by a plurality of poises or riders, although two hooks are shown, one is to be used at a time.

Fig. 2 illustrates a modification of the rider or poise suspension, making possible the use of a third poise or rider.

As illustrated, the scale beam 10 of any suitable size or material, fulcrumed in its center as at 11 is provided with a suitable indicator or pointer 12 secured thereon by means of a set screw 13 or the like. In order to save weight and material a plurality of openings 14 are provided, and the ends of the beam are engaged by suitable poise or equilibrium adjusting screws 15 or the like.

The arm 16 of the beam 10 to the left of its fulcrum 11 is provided with graduations in milligrams or other relatively small denominations reading from left to center, while the arm 17 of the beam 10 to the right of its fulcrum 11 is equipped with a scale divided in relatively larger denominations as for instance centigrams and is provided with notches 18 at equally divided points coinciding with the graduations.

A rod 19 is rotatably and slidably supported in supports 20, 21 and is equipped with a hook 22, for the suspension of poises or riders 24, 25 arranged to engage with either of the riders in any position of the scales.

In the modified form of poise or rider suspension illustrated in Figure 2, the poises or riders 26 have preferably the form shown, and are suspended by means of their upper end eyes 27 from hooks 28 on the upper ends of rods 29 passing through the rods 30 arranged above and at both sides of the scale beam 31.

The operation of my novel scale or balance beam and its use will be entirely clear from the above description by the simultaneous inspection of the drawing, and it will be evident that if both riders shown suspended above the beam are released on the zero points on the beam, the balance is poised. By moving or shifting either rider to the right, the right arm of the beam becomes loaded in proportion.

It will be clear that the riders for the different denominations may have easily distinguishable colors.

It will be understood that I have disclosed the preferred form of my device only as an example of the many ways in which the same may be practically constructed, and that I may make such changes in the general arrangement of my device, particularly in the scales etc., and in the construction of the minor details of the balance beam as come within the scope of the appended claims without departure from the spirit of my invention and the principles involved.

Having thus described my invention, what I claim as new and desire to secure by Letters Patent is:

1. A balance beam comprising two series of graduations of varying denominations, a centrally located fulcrum for said beam, rotatable and sliding means above said beam, riders or poises suspended from said means, and a means for suspending said poises from said rods.

2. In combination, a balance beam fulcrumed in its center, a scale divided in relatively small denominations on one arm of said beam at one side of the fulcrum, and a scale divided in larger denominations on the other arm of said beam on the other side of its fulcrum, the latter arm notched at equally divided points to coincide with the graduations of this arm.

3. A balance beam, a centrally located fulcrum for the same, a milligram scale on said beam to one side of its fulcrum, a centigram scale on the other side of the beam's fulcrum, the beam on this side notched to coincide with the scale therein, and rods rotatably and slidably arranged above said beam, hooks on said rods, and poises suspended from said hooks above the milligram and centigram scales on said beam.

4. A balance beam, a centrally located fulcrum therefor, varying graduations on said beam to both sides of its fulcrum, a pair of rotatable and slidable rods above said beam, bars passed through said rods, hooks formed on the upper ends of said bars, and poises or riders suspended from said hook over the graduations on said beam.

Signed at New Rochelle, in the county of Westchester and State of New York, this 16th day of May, A. D. 1928.

JOHN P. MÜLLER.